United States Patent Office 3,142,482
Patented July 28, 1964

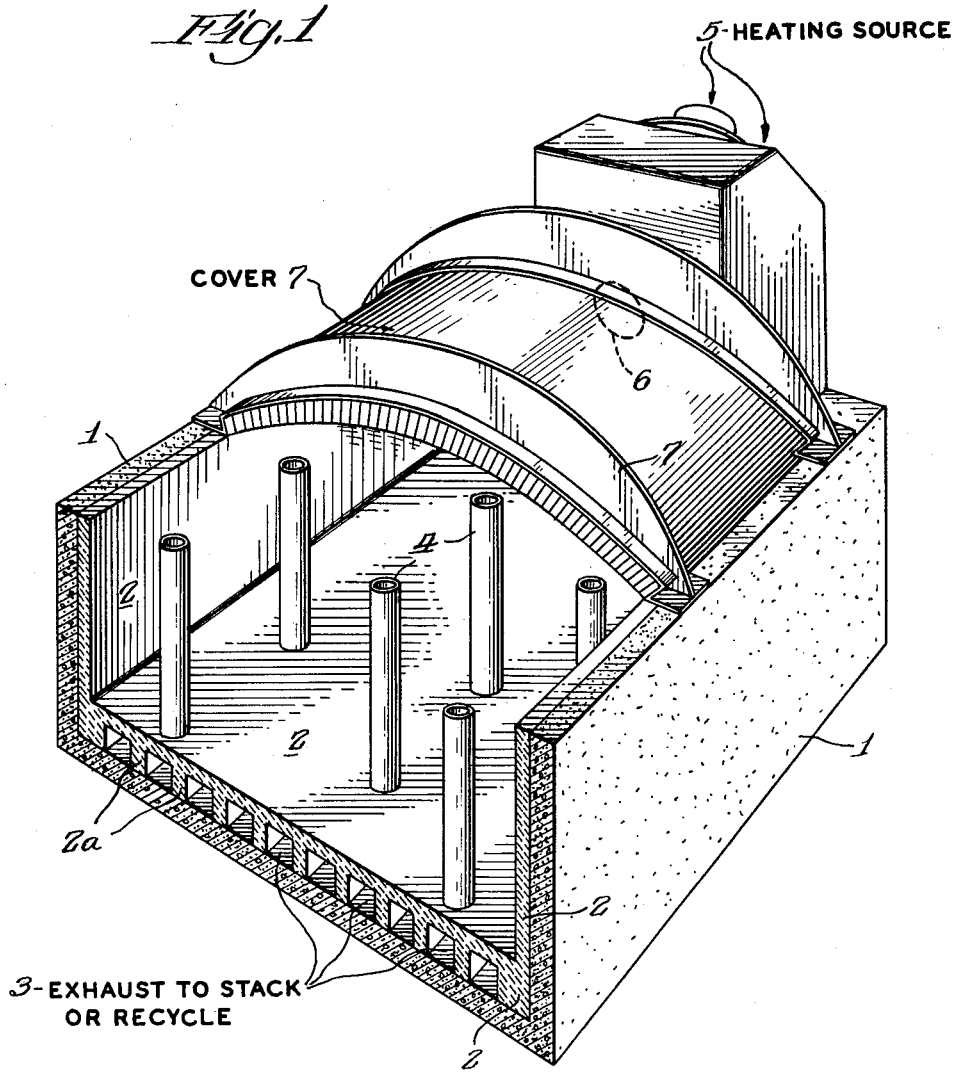

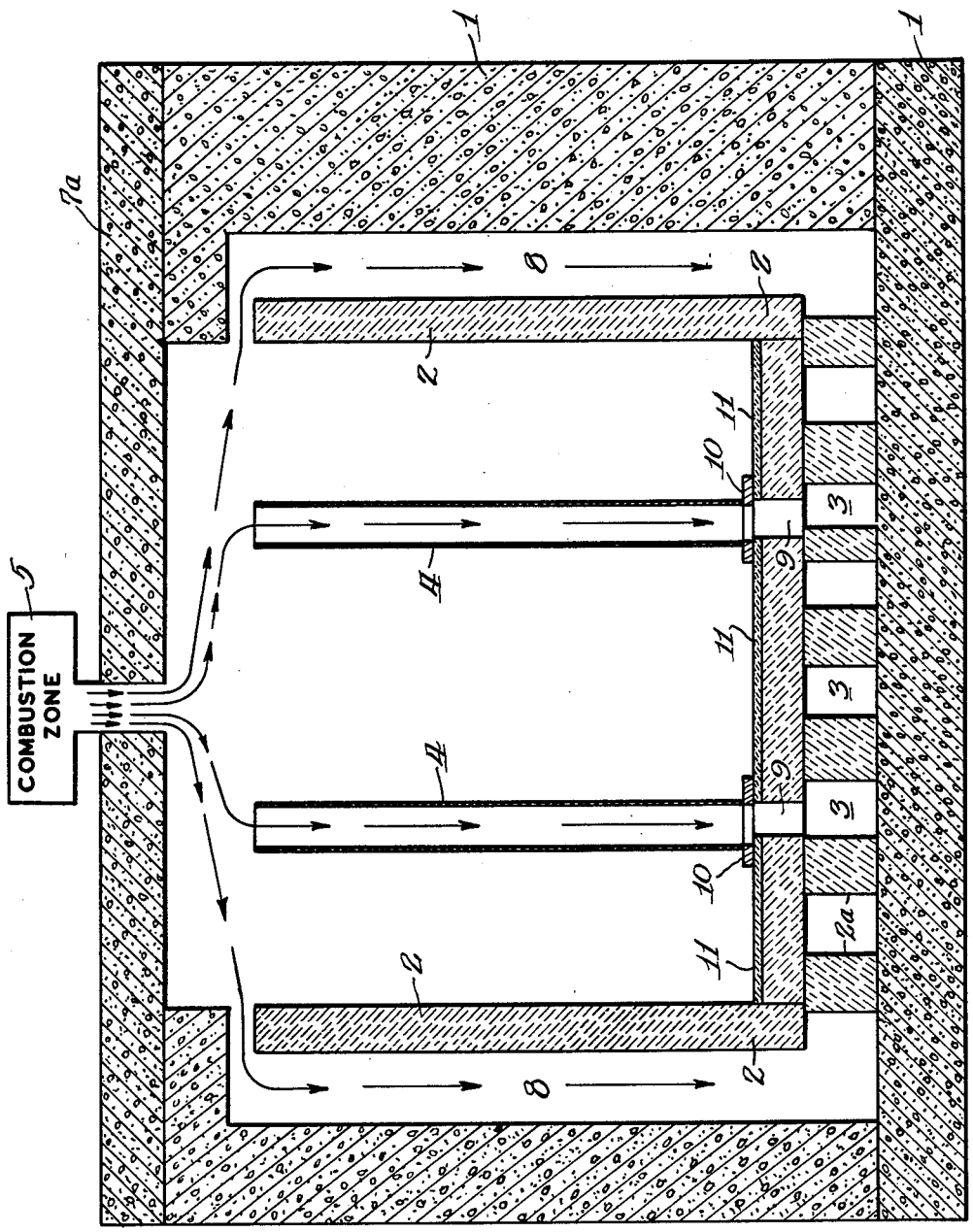

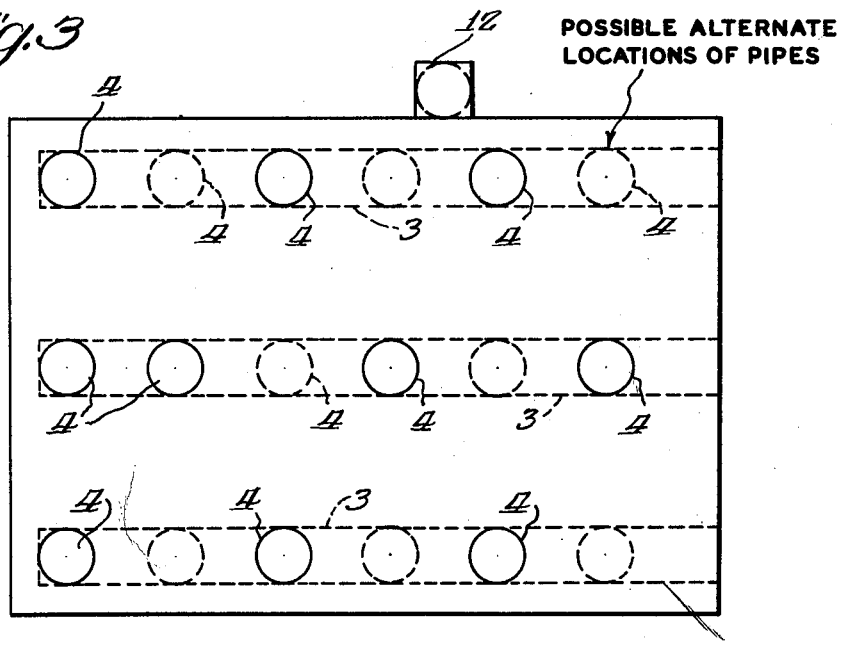

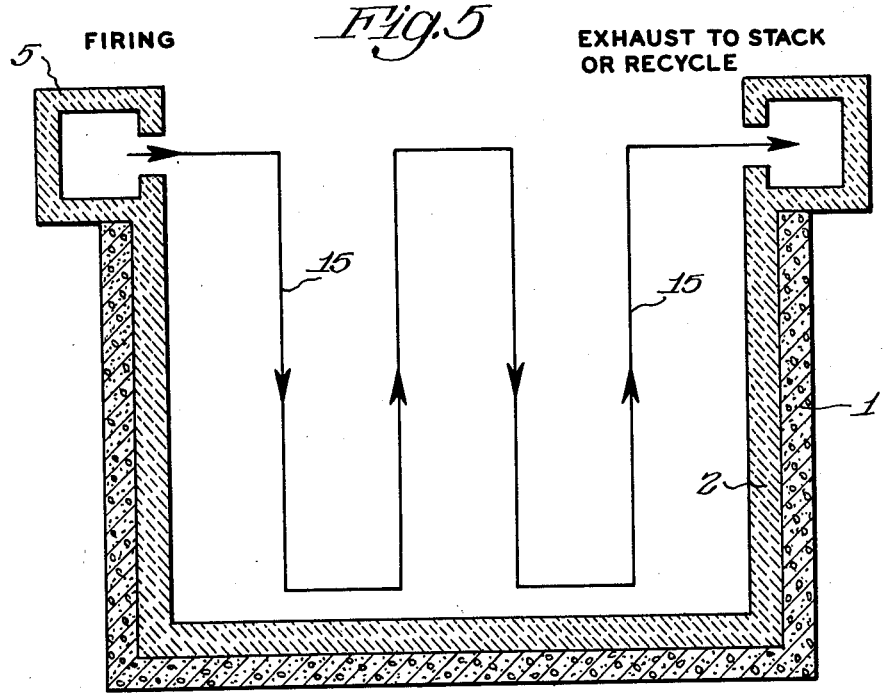
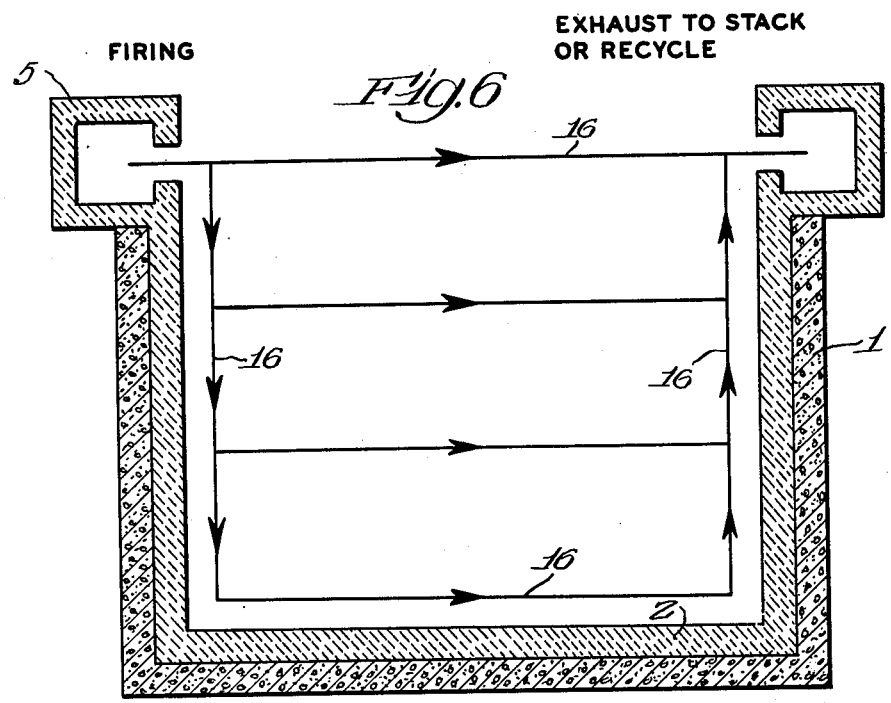

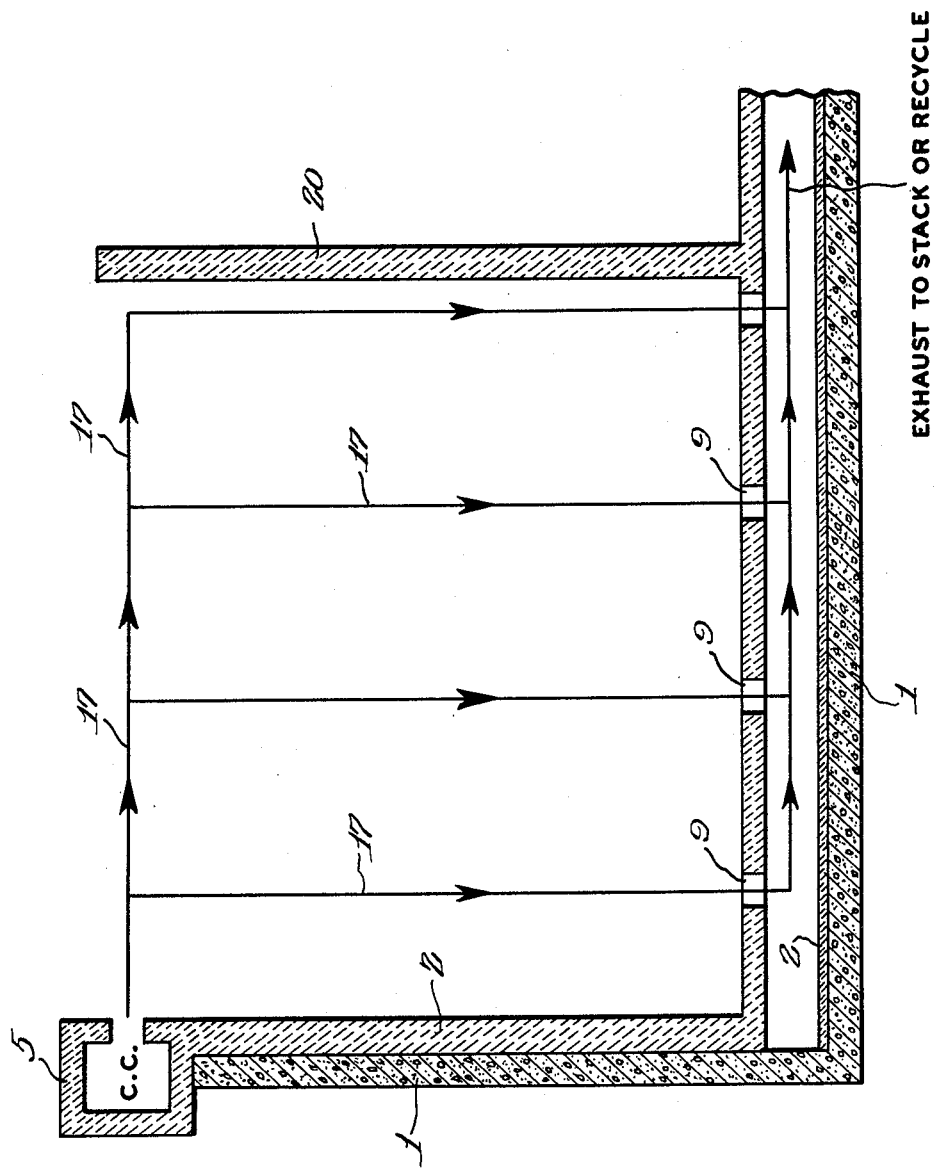

3,142,482
CARBON BODY BAKING FURNACE
Wilfred M. Kenan, Lancaster, Calif., assignor to Great Lakes Carbon Corporation, New York, N.Y., a corporation of Delaware
Filed Mar. 21, 1961, Ser. No. 97,373
9 Claims. (Cl. 263—41)

This invention relates to an improved and novel baking furnace, particularly constructed and adapted for the baking of carbonaceous bodies. The invention relates further to a furnace which is particularly adapted to bake carbonaceous bodies of widely different sizes and shapes, and to accomplish this under conditions of increased thermal efficiency, increased unit capacity, and reduced furnace construction and operational costs. The invention relates further to the use of a furnace such as described, while achieving improved quality in the baked bodies produced.

The conventional practice in constructing furnaces to bake carbonaceous bodies essentially has been to construct such furnaces in several non-metallic refractory brick compartments or chambers, in which the "green" carbonaceous bodies are placed. Heated gases typically are passed around these non-metallic brick chambers along the side walls of the furnace, in some cases under the bottom of said chambers and also through the partitioning flue walls which divide the furnace into individual chambers. These heated gases are circulated for a sufficient length of time and at sufficiently high temperatures to bake the green carbonaceous bodies placed in the furnaces. Packing materials are also placed within the chambers around the carbonaceous bodies to physically support the bodies and to prevent their being damaged by oxidation during the baking cycles. Such furnaces are constructed on a somewhat permanent basis because of the amount of work required to lay all the non-metallic brick used in constructing the furnace and the partitioning chamber walls thereof, and because of the great time and expense that would be required if the flue arrangements surrounding the various chambers were changed frequently such as with each baking cycle.

Because of the foregoing it is frequently the case that furnaces best designed to bake carbonaceous bodies of a given dimension are also employed to bake carbonaceous bodies of other or different dimensions, and for which the furnaces are ill-suited. This often results in the production of bodies which are not baked uniformly throughout and which therefore possess different properties, such as coefficient of thermal expansion (CTE), resistivity, etc., at different portions of the same pieces. Fairly high percentages of scrap materials result therefore from such practices. The sizes of the bodies being baked in such furnaces also are limited to the dimensions of the chambers which make up the furnace, the construction of special furnaces being required to process bodies larger than said chambers. Such furnaces also are very expensive to construct because of the use of a large number of non-metallic refractory bricks which in themselves are costly and which also require high labor costs for their installation. Also during their operation, different elements of such furnaces such as the partitioning non-metallic refractory brick flue walls very often become damaged, cracked or ruptured by thermal and/or mechanical strain and require frequent and costly rebuilding.

It is an object of this invention to design and construct baking furnaces which overcome many of the disadvantages inherent in such conventional baking furnaces of the prior art. It is a further object of this invention to construct baking furnaces which are very flexible with respect to the dimensions and shapes of the carbon bodies being baked and which at the same time are very thermally efficient. It is another object of this invention to construct baking furnaces which result in high and uniform quality of the bodies baked. It is an additional object of this invention to construct furnaces having reduced initial and operational costs compared to prior art furnaces, while at the same time accomplishing the foregoing enumerated objectives.

It is a finding of this invention that these and other objects may be achieved by employing a metal flue system or metallic flues or pipes within the baking furnaces. Such a metal flue system or metallic flues or pipes may replace all or some of the non-metallic refractory flues employed in the past or they may be used in conjunction with same. Such flues may be used near the walls of the furnace or any other place within the furnace where high concentration of heat is desired. The use of such metallic flues increases the uniformity of heating the carbon bodies placed within the furnaces employing same. At the same time they maintain maximum flexibility for each furnace in respect to flue location or flue system design and the sizes and shapes of the carbonaceous bodies being baked. Their use minimizes the need for specially constructed furnaces. The use of such metallic flues also results in a reduction in the initial and operating costs of baking furnaces and in a utilization of a greater proportion of the baking furnace's total volume for the stock being baked.

The invention will become clearer by referring to the attached drawings wherein:

FIGURE 1 is a perspective view of a carbon baking furnace of this invention;

FIGURE 2 is a cross-sectional view of a baking furnace having a flue system in accordance with the teachings of this invention;

FIGURE 3 is a plan view of a carbon baking furnace of this invention, said figure also indicating, by means of dotted lines, the flexibility of flue location feature of this invention;

FIGURE 4 is a heat flow diagram for some typical baking furnaces of this invention; such as those shown in FIGURES 1, 2, 3 and 7;

FIGURE 5 is a cross-sectional view of a baking furnace of this invention, having a metallic flue system, shown schematically, constituting a continuous arrangement whereby the flow of hot gases through the system changes from horizontal to vertical to horizontal to vertical etc.;

FIGURE 6 is a cross sectional view of a baking furnace of this invention, having a metallic flue system, shown schematically, constituting a system of interconnected horizontal and vertical flues in which most of the heat for the furnace is radiated from the horizontal flues; and FIGURE 7 is a cross sectional view of a baking furnace of this invention, having a metallic flue system, shown schematically, constituting a system of interconnected horizontal and vertical flues as well as flue tunnels in the bottom of the furnace, whereby most of the heat for the furnace is radiated through the vertical flues. This figure also shows the start of another adjacent furnace chamber, which may be a mirror image of the one shown, or of a type such as shown in the other figures.

The metallic flue furnace may be of any size and shape. Typically it may be rectangular such as shown in FIGURE 1. If rectangular, typical inside dimensions may measure about 10 feet deep, 13 feet long and 9½ feet wide.

As shown in FIGURE 1, the furnace may typically be made by pouring cement or concrete for the outer frame or shell 1 of the dimension desired. This shell may be interiorally lined at the sides and at the bottom by a system of non-metallic refractory bricks 2 shown, for convenience, as one continuous member. The bottom of this refractory lining 2 possesses a system of partitioning brick columns 2a extending downwardly therefrom to the concrete shell. These partitioning non-metallic brick columns 2a define tunnels 3 which communicate between metallic flues 4 and an exhaust system to stack or recycle. The interior of the furnace is heated by a heating source or fire box or combustion zone 5 which, by means of a fan (not shown), forces the heated gases through an opening 6 into the furnace and down through the metal flues. The top of the furnace may be bridged by refractory lined hogback covers 7.

FIGURE 2 shows a modified baking furnace of this invention in which the non-metallic refractory brick lining 2 of the furnace is spaced or separated from the cement or concrete shell 1 of same, thereby defining flue paths 8 between the walls of same. The heated gases in this modified furnace pass from the combustion zone 5 down through flue paths 8, and also through the vertical metallic flues 4, through openings 9 in the non-metallic refractory floor thence through bottom tunnels 3 to exhaust as with the furnace of FIGURE 1. The heat for baking the carbon bodies placed within this furnace, therefore, is transmitted from non-metallic refractory walls 2 as well as from the metal flues 4, as compared to the furnace of FIGURE 1 where substantially all of the heat for baking the carbon bodies is transmitted from the metal flues 4. The cover for the furnace may be other than of the hogback type. Numeral 7a is therefore employed for the furnace of FIGURE 2 to indicate that such variations are possible. The flues may have flanges 10 at their base to facilitate their vertical positioning and support on a sheet of refractory shiplap tile 11 covering the floor 2, or these flanges 10, which typically may be rectangular in shape may be set down onto the refractory floor 2 of the furnace with suitably modified or partially cut shiplap tile built up over same to support the flues in the furnace structure.

After the flues are positioned where desired and as indicated with respect to the size and shape of the "green" carbon bodies to be baked, the packing materials and bodies to be baked are placed in the furnace in accordance with conventional techniques employed in the art. The number of flues employed and their positioning and the positioning of the carbon bodies will, of course, be selected with due regard to the baking cycle to be followed, to evenness of baking of the carbon bodies and to effective utilization of the space of the furnace for useful baking purposes.

In FIGURE 3 a plan view of a baking furnace of this invention is shown with certain of the flues designated by broken lines. These are to show possible alternate locations for the metal pipe flues 4 and indicate that flues may be placed in these or other locations if desired. If flues are not employed in these locations, the openings in the floor of the furnace may, of course, be covered with non-metallic refractory tile or bricks or metal plates, etc. The alternate location designated as 12 indicates that the walls of the furnace may be constructed in such a manner that the metal flues may occupy suitably constructed and spaced indentations in same. Such a construction is particularly useful for maximum utilization of furnace baking space. It will also be obvious from FIGURES 1 and 2 that the spacing of the bottom non-metallic refractory bricks 2a may be varied greatly and that the positioning of longitudinal bottom tunnels 3 (shown in dotted lines in FIGURE 3) is, therefore, highly variable. It will also be apparent from these figures and from FIGURE 3 that the metal or steel flues may be placed over any of the longitudinal tunnels and transversely over any position or positions on said tunnels. The number of metal pipe flues employed and their location will, as aforesaid, depend on the type and size of the green stock to be baked. For baking critical sizes and grades of stock, the metal flues can be arranged to heat each piece from four different directions. As compared to furnaces of the prior art, this greatly improves temperature uniformity in the stock thus resulting in higher quality baked carbon bodies and the reduction of scrap. This also permits the use of higher rates of baking the stock.

FIGURE 4 has already been previously described somewhat. It should be added that bottom non-metallic refractory flue tunnels will not always be employed, as will become clearer after FIGURES 5 and 6 are described, and that recycling part of the exhaust to the combustion zone or chamber is optional.

In the furnace of FIGURE 5, a metal flue system 15 is employed. This consists of a continuous arrangement of connected horizontal and vertical flues which conduct the heated gases from the firing chamber to exhaust. If desired, several such flue systems can be employed throughout the furnace, with the green carbon bodies to be baked placed therebetween in either transverse or longitudinal directions or both.

In the furnace of FIGURES 6 and 7 yet other metal flue systems 16 and 17 respectively consisting of continuous arrangements of connected horizontal and vertical flues are employed. In FIGURE 7 the reflection wall 20 may serve to separate two adjacent furnace chambers of similar flue design or of different flue design. The use of adjacent chambers, with independent combustion zones for each, has the advantage over a single chamber of reducing heat loss through the outer end wall of the furnace furthest from the heating zone.

It can be appreciated from the foregoing described figures that the flue arrangements possible in furnaces of the present invention are practically numberless and but a matter of choice of one skilled in the art once the teachings of this invention are before him.

The tops of the open metal flues such as employed in the furnaces of FIGURES 1, 2 and 3 should typically be about flush with the top of packing media cover placed in the furnace. This cover is typically a layer of sand over the packing media. The packing media typically may be a mixture in varying proportions of sand and coke. It is placed between the non-metallic refractory lining 2 and the metal flues and surrounds the stock being baked. Its function is to serve as a heat transfer medium, to minimize or prevent oxidation of the stock being baked and to support the green bodies while they are being baked, etc. It and the sand cover layer should, of course, both be kept out of the flue system of the furnace.

Because of the variability of processing carbon, the conditions employed in operating the furnaces are not rigidly standardized. It may be stated, however, that, generally, temperatures should be maintained in the combustion zone which will give a temperature rise from about 25° C./day to about 120° C./day temperature rise on stock packed within the furnace, during the baking cycle. In general, the bodies baked in accordance with the teachings of this invention will be fully baked if they are heated to a final baking temperature in the region of between about 750° C. and about 1250° C. and over a period from about 15 to about 30 days.

As shown in FIGURE 1, the heating source 5 or combustion zone, or fire box for the furnace will typically be external to the main furnace chamber and the heated gases admitted to the furnace through an opening such as 6 thereof. The use of more than one fire box is contemplated and the locations of same whether external to the furnace or inside same, near the top or bottom, or at the ends, etc., are all considered a matter of choice.

It should of course be appreciated that many variations are possible when carrying out the teachings of this invention and, therefore, considered within the scope thereof. For example, the metallic flues may vary widely in their composition, in their dimensions, and in the number employed. The flues typically may be made from iron or stainless steel, with stainless steel preferred, will generally be from 2 inches to 8 inches in diameter and will be employed in such a number and/or design configuration that the cross section of the furnace area to the metal flue area will typically be about 12 to 1. Ceramic coated metal flues are also contemplated. The heated gases may optionally be blown into the bottom tunnels 3 and up through the metal flues and side wall flues rather than vice versa as is the case shown in FIGURE 2. Suction fans may be employed rather than or in conjunction with blowers. The open flues of FIGURES 1 and 2 may be used in other positions, such as horizontal rather than in the illustrated preferred vertical positions. This can conveniently be accomplished by constructing flanges such as 10 on each end of the flues and inserting them in slots machined or built into the refractory side walls 2 of the furnace shown in FIGURE 2. The side walls 2 then would have gas openings similar to 9 drilled therethrough to communicate with the refractory flue channels 8. And the metal flues, either vertical or horizontal etc., can optionally be permanently positioned in place in the furnace either to the base thereof when employing vertical flues or to the walls thereof when employing horizontal flues. Generally, however, it will be preferred to so construct the furnace that the metal flues therein, whether vertical or horizontal or of other type, are easily relocatable. By the term "easily relocatable" is meant that not more than a minor number such as about 10 refractory bricks or a few plates of shiplap tile 11 surrounding the base or the ends of the metal flues will have to be shifted or adjusted or taken up and relaid in order to change the location of a flue.

As previously stated, the employment of metal flues in accordance with the teachings of this invention considerably reduces the operational costs of baking furnaces. For example, with furnaces of the prior art which employ non-metallic refractory partitioning flues, the costs to build or rebuild flue walls in such a furnace are many times greater than the initial flue costs or the costs required to move the metal flues of this invention. Typically also with furnaces of the prior art, it required about a week for two bricklayers to construct a new flue and about a month to re-flue an entire furnace. As compared to this, the complete re-flueing of a comparable in size furnace of this invention requires only about 2 days for two bricklayers to complete.

Carbon bodies baked in furnaces such as described herein and according to the processes described have been found to have excellent properties.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim:

1. In a carbon body baking furnace of the type employed for baking carbon electrodes having a cover and a bottom and walls therebetween, and a heating means and an exhaust means, the improvement which comprises a metallic flue system within said furnace communicating between said heating means and said exhaust means, the metal flues of said system having inlet and outlet openings therein only at their ends, and being imperforate therebetween.

2. In a carbon body baking furnace of the type employed for baking carbon electrodes having a cover and a bottom and walls therebetween, and a heating means and an exhaust means, the improvement which comprises a metallic flue system and a non-metallic refractory flue system within said furnace communicating between said heating means and said exhaust means, the metal flues of said metallic flue system having inlet and outlet openings therein only at their ends, and being imperforate therebetween.

3. A furnace according to claim 1 wherein the metallic flue system comprises a combination of horizontal and vertical flues.

4. A furnace according to claim 2 wherein said metallic flue system comprises a plurality of vertical flues and wherein said non-metallic refractory flue system comprises tunnels within the bottom of said furnace.

5. A furnace according to claim 2 wherein said metallic flue system comprises a plurality of vertical flues and wherein said non-metallic refractory flue system is peripheral and comprises channels along the walls of said furnace and tunnels within the bottom of said furnace.

6. A furnace according to claim 4 wherein said vertical flues are easily relocatable.

7. A furnace according to claim 5 wherein said vertical flues are easily relocatable.

8. A heating system of the type employed for baking carbonaceous electrodes comprising a base and outer walls, spaced non-metallic refractories on said base defining bottom flue channels, a shell of non-metallic refractory side and end walls abutting said outer walls, a non-metallic refractory floor atop and supported by said spaced non-metallic refractories on said base and having openings therethrough communicating with said bottom flue channels, vertical metal flues having inlet and outlet openings therein only at their ends, and being imperforate therebetween communicating with the openings in said floor and supported by said floor, and means for circulating heated gases through said metal flues and along said bottom channels.

9. A heating system of the type employed for baking carbonaceous electrodes comprising a base and outer walls, spaced non-metallic refractories on said base defining bottom flue channels, a shell of non-metallic refractory side and end walls spaced from said outer walls and defining gas route flues therebetween, a non-metallic refractory floor atop and supported by said spaced refractories on said base and having openings therethrough communicating with said bottom flue channels, vertical metal flues having inlet and outlet openings therein only at their ends, and being imperforate therebetween communicating with the openings in said floor and supported by said floor and means for circulating heated gases through said metal flues, along said bottom channels and between said inner and outer walls.

References Cited in the file of this patent

UNITED STATES PATENTS

| | | |
|---|---|---|
| 246,766 | Hass | Sept. 6, 1881 |
| 1,170,313 | Nagelschmitz | Feb. 1, 1916 |
| 2,699,931 | Buhler et al. | Jan. 18, 1955 |
| 2,863,606 | Tatsch | Dec. 9, 1958 |
| 3,048,382 | Mansfield | Aug. 7, 1962 |

FOREIGN PATENTS

| | | |
|---|---|---|
| 458,298 | Great Britain | Dec. 16, 1936 |